(12) United States Patent
McKenna et al.

(10) Patent No.: US 9,940,656 B1
(45) Date of Patent: Apr. 10, 2018

(54) SMART DEMONSTRATION DEVICE

(71) Applicant: Amazon Technologies, Inc., Reno, NV (US)

(72) Inventors: Michael Terrance McKenna, Bellevue, WA (US); Jonathan A. Leblang, Menlo Park, CA (US); Ramon Alfonso Palacios Durazo, Issaquah, WA (US); Allen Macleod Hughes, Kirkland, WA (US); Jason VanDuine, Banbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1130 days.

(21) Appl. No.: 14/036,883

(22) Filed: Sep. 25, 2013

(51) Int. Cl.
*G06Q 30/00* (2012.01)
*G06Q 30/06* (2012.01)

(52) U.S. Cl.
CPC ................... *G06Q 30/0623* (2013.01)

(58) Field of Classification Search
CPC .......................................... G06C 30/06–30/08
USPC ................................................ 705/26.1–27.2
See application file for complete search history.

(56) References Cited

U.S. PATENT DOCUMENTS

| | | | |
|---|---|---|---|
| 2006/0200413 A1* | 9/2006 | Kessel | G06Q 30/02 705/50 |
| 2007/0194918 A1* | 8/2007 | Rabinowitz | G08B 13/1961 340/568.2 |
| 2013/0297281 A1* | 11/2013 | Niemeyer | G06F 17/5009 703/20 |

OTHER PUBLICATIONS

"NextGen Venturi Ltd. Announces the Venturi Mini for Music Phones and MP3, Featuring Stereo Bluetooth for In-Car Music and Hands-Free Calling" (Business Wire, Nov. 13, 2007) (Year: 2007).*

* cited by examiner

*Primary Examiner* — Ethan D Civan
(74) *Attorney, Agent, or Firm* — Lee & Hayes, PLLC

(57) ABSTRACT

A smart demonstration apparatus that enhances the experience of customers, merchants, and others with electronic devices is described herein. The smart demonstration apparatus may include components that assist merchants in demonstrating and selling electronic devices, assist customers in acquiring and using electronic devices and assist service providers in managing the demonstration, acquisition and use of electronic devices. The smart demonstration apparatus may also include other components that provide a variety of other functionality. The smart demonstration apparatus may be placed at a merchant's location where an electronic device is offered for acquisition or may be placed at other locations. A service provider may communicate with the smart demonstration apparatus to enhance the experience of customers, merchants, and others with electronic devices.

19 Claims, 11 Drawing Sheets

SMART DEMONSTRATION DEVICE

BACKGROUND

Merchants and service providers often share a common goal of creating a meaningful user experience with electronic devices. For example, a merchant that is selling electronic devices and a service provider that provides services for using the electronic devices may strive to successfully demonstrate, sell and service the electronic devices. Unfortunately, these actors may rarely act together to achieve this common goal. Instead, merchants may simply sell electronic devices, while service providers may, once the electronic devices are purchased, provide services to end-users.

Additionally, in many instances merchants may not have the time or resources to properly demonstrate electronic devices to customers. For example, a merchant may not have the time or resources to manage the operation of demonstration electronic devices that are provided for customers to interact with. This may result in demonstration electronic devices remaining in in-operable states long after the devices have stopped functioning. Further, electronic devices may be sold through merchants that have little or no knowledge about the electronic devices. As a growing number of electronic devices are being purchased, there is an increasing need to enhance the demonstration, purchase and service of electronic devices.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
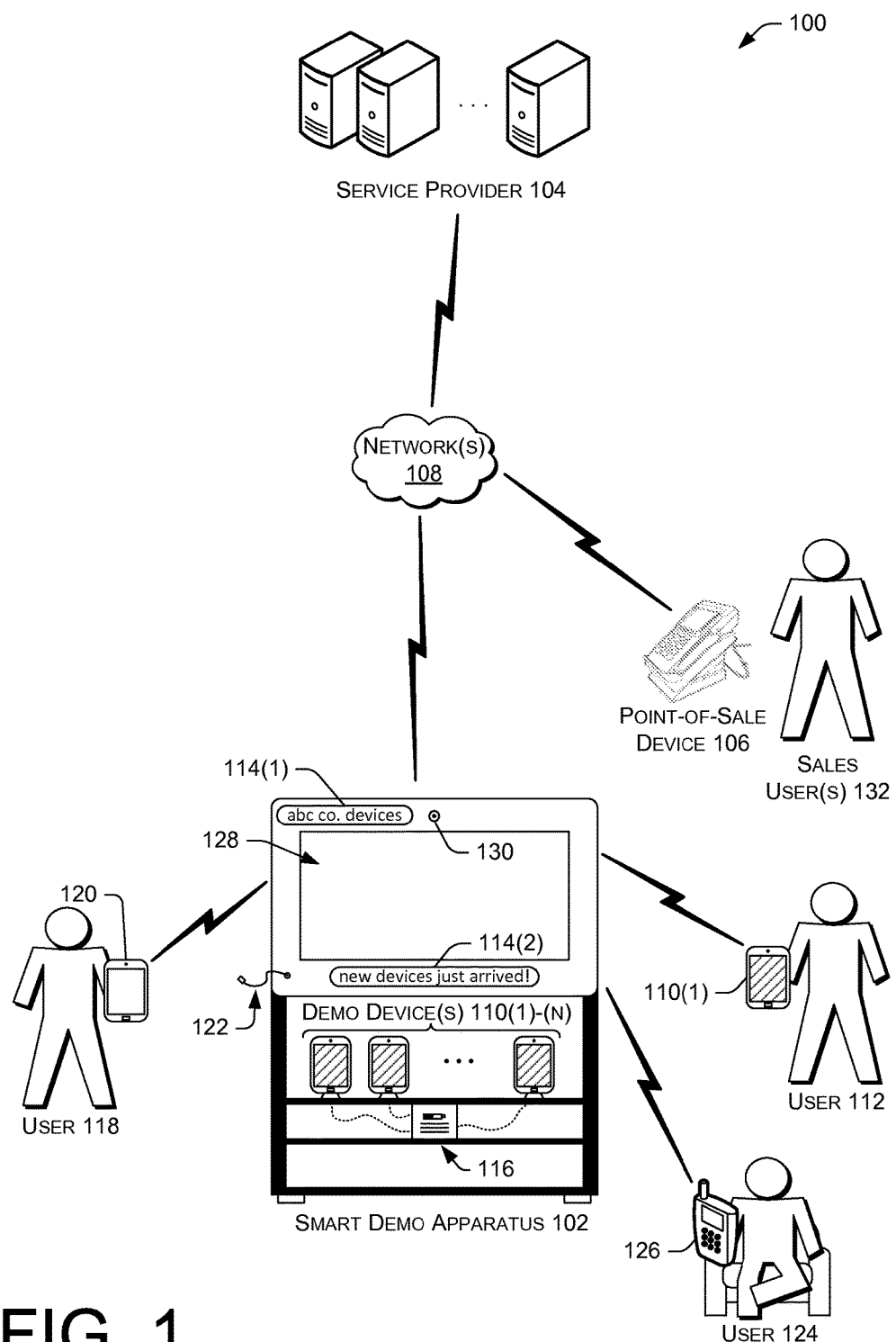
FIG. 1 illustrates an example architecture that enhances the experience of customers, merchants, and others with electronic devices.

This disclosure describes, in part, a smart demonstration apparatus that enhances the experience of customers, merchants, and others with electronic devices. The smart demonstration apparatus (hereinafter "smart demo apparatus") includes components that assist merchants in demonstrating and selling electronic devices, assist customers in acquiring and using electronic devices and assist service providers in managing the demonstration, acquisition and use of electronic devices. The smart demo apparatus may also include other components that provide a variety of other functionality. The smart demo apparatus may be placed at a merchant's location where an electronic device is offered for acquisition or may be placed at other locations. A service provider may communicate with the smart demo apparatus to enhance the experience of customers, merchants, and others with electronic devices.

In some implementations, the smart demo apparatus demonstrates an electronic device that is being offered for acquisition, such as a tablet computer, an electronic book (eBook) reader device, a smart phone and so on. For example, the smart demo apparatus may include an enclosure with stands to present demonstration devices to customers. The customers may interact with the demonstration devices to explore capabilities of the devices. The smart demo apparatus may also include a display screen, speakers and/or other output components to provide content about the demonstration devices, such as an advertisement, product details, and other types of content.

The smart demo apparatus may include a network component to communicate with a service provider that is located remotely to the smart demo apparatus. For instance, the smart demo apparatus may include a cellular network component or a wired network component to maintain communication with the service provider. The smart demo apparatus and the service provider may operate cooperatively to provide a variety of functionality.

In one example, the service provider may assist the smart demo apparatus in managing demonstration electronic devices that are presented to customers. To illustrate, the smart demo apparatus may monitor the operation of the demonstration devices and provide information about the demonstration devices to the service provider. If, for instance, an error occurs on a demonstration device, the service provider may assist the smart demo apparatus in resolving the error. In another illustration, the service provider may provide demonstration content to the smart demo apparatus to be displayed, such as a new demo video or new product details for a new type of device that is being sold.

In addition to assisting the smart demo apparatus in managing demonstration electronic devices, the service provider may assist in providing customer services for electronic devices. These electronic devices may include devices that are being offered for acquisition, demonstration devices, and/or devices that have been previously purchased through the merchant or elsewhere. To illustrate, a user may interact with a customer service representative in a video conferencing format through the smart demo apparatus to discuss an error that has occurred on his device. The user in this illustration may connect his device to the smart demo apparatus to perform diagnostics and resolve the problem.

The service provider may also assist the smart demo apparatus in providing sales services. For instance, the service provider may provide training content to the smart demo apparatus to train sales representatives of the merchant about the electronic devices, such as by presenting videos about the capabilities of the devices or videos about how to set-up demonstration devices. In another instance, the sales representatives may upload sales information about the electronic devices or other information through the smart demo apparatus. The service provider may collect the information to monitor the sales of electronic devices.

In yet further examples, the service provider and the smart demo apparatus may cooperatively operate to provide content to electronic devices. Here, the smart demo device may act as a content access point that provides access to various types of content, such as videos, audio, applications, electronic books (eBooks) and so on. The content may be provided to any electronic device that is located at the merchant, such as a device that a user has brought in to the merchant, a device that a user has just acquired from the merchant or any other device. In some instances, the content may be streamed from the service provider to an electronic device, while in other instances the smart demo apparatus may store the content for later use by electronic devices.

Although many of the functions above and below are described as being performed with the assistance of a service provider, these functions may be performed independently of the service provider. That is, the smart demo apparatus may perform these functions locally without communicating with the service provider.

As this discussion highlights, the smart demo apparatus described above and below provides valuable resources to merchants, customers, service providers and others. Some of the components of the smart demo apparatus enable electronic devices to be effectively demonstrated to customers. Other components, meanwhile, assist service providers in managing the demonstration, acquisition and use of electronic devices. While the discussion both above and below highlights a few example components, it is to be appreciated that the smart demo apparatus may include a multitude of other components that similarly provide value to merchants, customers, service providers and others.

This brief introduction is provided for the reader's convenience and is not intended to limit the scope of the claims, nor the proceeding sections. Furthermore, the techniques described in detail below may be implemented in a number of ways and in a number of contexts. Some example implementations and contexts are provided with reference to the following figures, as described below in more detail. It is to be appreciated, however, that the following implementations and contexts are but some of many.

Example Architectures

FIG. 1 illustrates an example architecture 100 that that enhances the experience of customers, merchants, and others with electronic devices. The architecture 100 may include a smart demonstration apparatus 102 (hereinafter "the smart demo apparatus 102") to demonstrate, sell and service electronic devices and to perform a variety of other functions. The architecture 100 may also include a service provider 104 to manage the demonstration, acquisition and use of electronic devices and to perform other functions. Further, the architecture 100 includes a point-of-sale (POS) device 106 to facilitate the acquisition of items, assist in account management for electronic devices and perform other functions. The smart demo apparatus 102, the service provider 104 and/or the POS device 106 may communicate via one or more networks 108 (hereinafter "the network 108"). The network 108 represents any one or combination of multiple different types of networks, such as the Internet, cable networks, wireless networks, wired networks, and so on.

The smart demo apparatus 102 may present demonstration electronic devices 110(1)-(n) (hereinafter "the demo devices 110") for demonstration to customers. The demo devices 110 are illustrated with diagonally-lined screens to differentiate these devices from other devices that are described herein. Each of the demo devices 110 may comprise an electronic device that is being offered for acquisition or a customized device that includes a more limited set of components (e.g., software and/or hardware), or a larger set of components, than a device that is being offered for acquisition. The smart demo apparatus 102 may include a cabinet-like, table-like or any other type of enclosure with equipment (e.g., stands or other structures) to present the demo devices 110. The customers may remove the demo devices 110 from the stands and interact with the demo devices 110. In the example of FIG. 1, a user 112 has removed the demo device 110(1) to explore the capabilities of the demo device 110(1). As illustrated in FIG. 1, the smart demo apparatus 102 may include signs 114(1) and 114(2) to advertise the demo devices 110.

The smart demo apparatus 102 may include a network component to communicate with the service provider 104. The network component may comprise a wireless component to send and receive data wirelessly, such as a cellular network radio (e.g., 3G or 4G wireless radio) or Wi-Fi® radio, or may comprise a wired network component (e.g., Ethernet connection). Since the smart demo device 102 may generally be located at a bricks-and-mortar store or another location that is remote to the service provider 104, the network component may enable the service provider 104 to assist the smart demo apparatus 102 in performing a variety of functionality.

In some instance, the service provider 104 may assist the smart demo apparatus 102 in managing the demo devices 110. This management include checking the operational state of the demo devices 110, determining how much the demo devices 110 are being used, identifying an amount of traffic by the demo devices 110 (e.g., through proximity sensors), updating content on the demo devices 110 and so on. In some instances, the smart demo apparatus 102 may monitor power supplied to the demo devices 110 through a power supply unit 116, which may include a back-up power source (e.g., a battery). The power supply unit 116 will be discussed in further detail in reference to FIG. 2.

The service provider 104 may also assist the smart demo apparatus 102 in providing customer services. Example customer services include device diagnostics, account management, returns and exchanges and so on. In the example architecture 100, a user 118 is interacting with the smart demo apparatus 102 regarding an error that has occurred on his electronic device 120. Here, the user 118 may have brought his electronic device 120 to the merchant where the smart demo apparatus 102 is located. The user 118 may connect the electronic device 120 to the smart demo apparatus 102 through one or more connectors 122 (e.g., USB® connection, proprietary connection, etc.) to enable the service provider 104 and/or the smart demo apparatus 102 to resolve the problem.

The service provider 104 may also assist the smart demo apparatus 102 in providing sales services. For instances, the service provider 104 may provide training content to the smart demo apparatus 102 to train sales representatives of the merchant about the electronic devices. In another instance, sales representatives may upload sales information about electronic devices or other information through the smart demo apparatus 102. The service provider 104 may collect the information to monitor the sales of electronic devices.

Additionally, or alternatively, the service provider 104 may assist the smart demo apparatus 102 in providing content to electronic devices. Here, the smart demo apparatus 102 may act as a content access point that provides various types of content, such as videos, audio, applications and so on. In some instances, the smart demo apparatus 102 provides users with access to content that may not otherwise be available to the users. To illustrate, the users may gain access to content that is only available to members of a subscription-based service or content that is exclusively provided through a particular merchant. In some instances, content may be streamed from the service provider 104 to an electronic device, while in other instances the smart demo apparatus 102 may store the content for later use by electronic devices. In the example of FIG. 1, a user 124 is using an electronic device 126 to view a sample of an eBook that is being offered for sale.

As illustrated in FIG. 1, the smart demo apparatus 102 may include one or more displays 128 to present various types of content and one or more cameras 130 to capture images. The smart demo apparatus 102 may also include other components that are discussed in further detail below in reference to FIG. 2.

Although many of the functions are described herein as being performed while the smart demo apparatus 102 is located at a bricks-and-mortar store, the smart demo apparatus 102 may be located at any location. In one example, the smart demo apparatus 102 is placed in a retail store where electronic devices are being offered for acquisition. In another example, the smart demo apparatus 102 is placed at another type of retail store, such as a coffee shop, grocery store and so on. In yet other examples, the smart demo apparatus 102 is placed at a subway station, park or other location that does not generally offer items for acquisition. As used herein, the acquisition of an electronic device or any other item may be achieved through purchasing, renting, borrowing, trading, bartering, or otherwise acquiring the electronic device or item.

The service provider 104 may be implemented as one or more computing devices including servers, desktop computers, or the like. In one example, the service provider 104 is configured in a server cluster, server farm, data center, mainframe, cloud computing environment, or a combination thereof. To illustrate, the service provider 104 may operate as a cloud computing device that provides cloud services, such as storage, processing, and so on.

Meanwhile, each of the devices 110, 120 and/or 126 may be implemented as any type of computing device, such as a laptop computer, a desktop computer, a smart phone, an electronic reader device (e.g., an eBook reader device), a mobile handset, a personal digital assistant (PDA), a portable navigation device, a portable gaming device, a game console, a camera, a tablet computer, a wearable computer (e.g., smart watch, smart glasses, etc.), a portable media player, a set top box, and so on. Each of the devices 110, 120 and/or 126 may include one or more network interfaces, one or more processors, memory, one or more input/output devices (e.g., mouse, keyboard, etc.), one or more cameras (e.g., rear-facing, front facing, etc.), one or more displays (e.g., touch screen), one or more sensors (e.g., accelerometer, magnetometer, etc.), and so on. The one or more processors may include a central processing unit (CPU), a graphics processing unit (GPU), a microprocessor, a digital signal processor, and so on.

As discussed above, the architecture 100 also includes the POS device 106 to facilitate the acquisition of items, assist in account management for electronic devices and perform other functions. The POS device 106 may generally be located at a same location as the smart demo apparatus 102, such as a merchant's store. The POS device 106 may be operated by one or more sales users 132 (hereinafter "the sales user 132"), such as a representative of a merchant (e.g., a sales representative, a manager or another employee), a representative of a supplier of the demo devices 110 (e.g., a sales representative for the supplier, a technician for devices, etc.), a third party that assists in management of the demo devices 110 (e.g., a technician to configure or set-up devices, a contractor paid by the supplier or the merchant, etc.) or another user. In some instances, a representative of a supplier may visit a store to check on the demo devices 110, answer sales questions or perform other functions. The POS device 106 may facilitate the acquisition of items (e.g., electronic devices) by causing payment transactions to be processed. This may include obtaining financial information from a financial instrument, such as a credit card or check, and sending the information to the service provider 104 and/or another service provider (e.g., a credit card interchange or other entity) to authorize the payment transaction. The POS device 106 may then receive information from a service provider indicating whether or not the payment transaction was authorized.

In some instances, a user may desire to associate an electronic device that the user is acquiring with an account, such as a user account for content access on a device, for syncing content of the electronic device with a cloud service and so on. Here, the POS device 106 may assist the user in creating an account and/or in associating the electronic device with an account. Further details of this account creation and management are described below in reference to FIGS. 10 and 11.

The POS device 106 may comprise an electronic cash register, a card reader device (e.g., mobile card reader device, in-store card reader, etc.) or any other payment system device. The POS device 106 may be configured to process transactions by utilizing financial instruments, such as credit cards, cash or coins and so on. The POS device 106 may include one or more processors, memory, network interfaces and so on.

Although the POS device 106 is illustrated in FIG. 1 as a separate device from the smart demo apparatus 102, in some instances the POS device 106 may be integrated with the smart demo apparatus 102. Further, although not illustrated in FIG. 1, the POS device 106 and the service provider 104 may communicate through an intermediary entity, such as a credit card interchange, payment reconciler or other entity that is generally involved in processing payment transactions.

Example Smart Demo Apparatus

Figure 2:
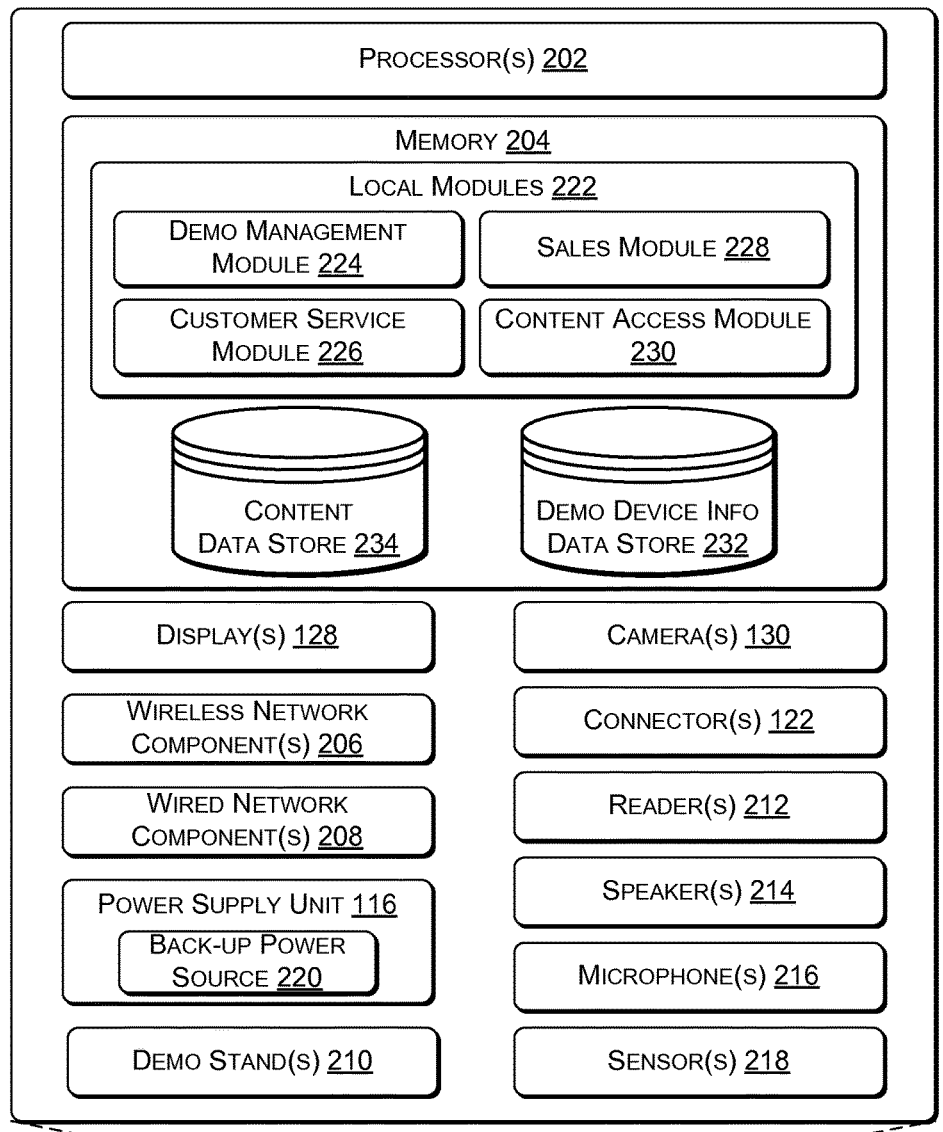
FIG. 2 illustrates details of an example smart demo apparatus.

FIG. 2 illustrates example details of the smart demo apparatus 102 of FIG. 1. The smart demo apparatus 102 may be equipped with one or more processors 202, memory 204, the one or more displays 128 (e.g., touch screen), one or more wireless network components 206 (e.g., network interfaces), one or more wired network components 208 (e.g., Ethernet connection), the power supply unit 116, one or more demo stands 210, the one or more cameras 130 (e.g., rear-facing, front facing, etc.), the one or more connectors 122, one or more readers 212, one or more speakers 214, one or more microphones 216 and one or more sensors 218 (e.g., proximity sensors, Global Positioning System (GPS), etc.). The one or more processors 202 may include a central processing unit (CPU), a graphics processing unit (GPU), a microprocessor, a digital signal processor, and so on. One or more of the components of the smart demo apparatus 102 may be housed in an enclosure (e.g., a casing or protective element), which may form an integrated device.

The one or more wireless network components 206 may comprise a cellular network radio (e.g., 3G or 4G wireless radio), a Wi-Fi® radio, a Bluetooth® radio, Near Field Communication (NFC) radio and so on. In some instances, the smart demo apparatus 102 may communicate with the service provider 104, electronic devices, the demo devices 110 and other devices through the one or more wireless network components 206. For example, the smart demo apparatus 102 may maintain constant or periodic communications with the service provider 104 over a cellular network.

The one or more demo stands 210 may removably receive the demo devices 110 (e.g., may detachably couple to a demo device) and may be equipped with security chords, alarms or other elements to secure the demo devices 110 to the smart demo apparatus 102. The one or more demo stands 210 may also include connectors (e.g., USB®) to provide power and communications to the demo devices 110. The one or more demo stands 210 may generally include any structural pieces to support the demo devices 110. For example, the one or more demo stands 210 may include arms, legs, a base or other elements that may maintain a demo device in an upright/laid position or any other position.

The one or more connectors 122 (e.g., USB® connection, proprietary connection, etc.) may allow devices in addition to the demo devices 110 to connect to the smart demo apparatus 102. The one or more readers 212 (e.g., reader device(s)) may comprise a barcode reader (e.g., a scanner), a credit card reader, a Quick Response (QR) code reader or a Radio-Frequency Identification (RFID) reader. The one or more readers 212 may obtain device identification information from a demonstration electronic device or another electronic device (e.g., directly from a device, from a box of the device, from a card associated with the device and so on).

The power supply unit 116 may manage power supplied to and/or a current amount of power of the demo devices 110. In some instances, power is supplied by a merchant or other entity where the smart demo apparatus 102 is located, while in other instances power is provided or routed through the smart demo apparatus 102 to the demo devices 110. In either case, the power supply unit 116 may monitor this power and/or battery life of the demo devices 110 to ensure that the demo devices 110 have sufficient power to remain operational. In some instances, the power supply unit 116 may include a back-up power source 220 to provide power to the demo devices 110 in cases where a primary power source (e.g., from a merchant or other entity) drops below a threshold level of power (e.g., in response to the primary power falling below a threshold). This back-up power source 220 may include battery power, a generator or any other type of power.

In some instances the one or more processors 202, memory 204 and/or other components of the smart demo apparatus 102 may form a server system. Here, the smart demo apparatus 102 may additionally, or alternatively, include components that are designed for a server. Further, in some instances the smart demo apparatus 102 may include or be associated with an input/output device, such as a mouse or keyboard.

The memory 204 may be coupled to the one or more processors 202 and include software and/or firmware functionality configured as one or more "modules." The term "module" is intended to represent example divisions of the software and/or firmware for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 2, the memory 204 may include local modules 222, namely a demo management module 224, a customer service module 226, a sales module 228 and a content access module 230. The local modules 222 may be executable by the one or more processors 202 to perform various operations.

The demo management module 224 may manage the demo devices 110 that are associated with the smart demo apparatus 102. This may include communicating with the demo devices 110 and/or the service provider 104. Example operations that may be performed to manage the demo devices 110 include:

Monitoring use of the demo devices 110 (e.g., how often the demo devices 110 are being interacted with by customers, what types of applications are being accessed and so on). This may include creating log information describing interaction events that have occurred, such as removing a demo device from a stand that holds the demo device (e.g., a lift from the stand), accessing an application on the demo device, turning-on the demo device or awaking the device from an inactive state (e.g., contacting a button to awaken the device form a sleep state), contacting a display screen or other surface of the demo device and so on. The log information may then be sent to the service provider 104 for storage, processing or to perform other management operations.

Monitoring user traffic around the demo devices 110 (e.g., through proximity sensors, cameras and so on).

Monitoring performance of the demo devices 110 (e.g., checking that the demo devices 110 are operating according to a particular standard, sending messages to the demo devices 110 to ensure that they are active and so on).

Monitoring power provided to and/or a current amount of power of the demo devices 110 (e.g., monitoring how much power an electrical outlet is providing to the demo devices, monitoring how much battery life the demo devices 110 include and so on). In some instances, the demo management module 224 may operate in cooperation with the power supply unit 116 to monitor power provided to and/or a current amount of power of the demo devices 110. In one example, the demo management module 224 may detect that an amount of power provided to a demo device has fallen below a threshold and/or that a current amount of power of the demo device has fallen below a threshold and may cause the power supply unit 116 to provide power to the demonstration electronic device (e.g., back-up power, battery power, etc.).

Providing power to the demo devices 110 (e.g., routing power of a merchant to the demo devices 110, providing back-up power to the devices (battery power) and so on).

Performing diagnostics on the demo devices 110 (e.g., identifying errors that have occurred on the demo devices 110) and resolving errors. In some instances, the smart demo apparatus 102 may provide information about the demo devices 110 to the service provider 104 in an effort to resolve issues on the demo devices 110. To illustrate, through monitoring a demo device, the demo management module 224 may detect that an error has occurred on the demo device (e.g., an application does not function, a display screen is not displaying content, etc.). The demo management module 224 may cause information regarding the error to be sent to the service provider 104, where the information is processed to identify the cause of the error. Thereafter, the service provider 104 may send information regarding resolution of the error to the smart demo apparatus 102 to resolve the error (e.g., an instruction to reboot a demo device, an instruction to reinstall an application, etc.).

Updating content on the demo devices 110 (e.g., applications, videos, images, audio, eBooks, an operating system, etc.). In one example, this includes receiving the content from the service provider 104 and sending the content to the demo devices 110.

Controlling content that is output on the demo devices 110 (e.g., causing different types of content to be presented). In one example, the smart demo apparatus 102 may recognize that two devices are located next to each other on the smart demo apparatus 102 and show a customer what would happen if he owned two devices (e.g., display particular content when the devices are placed near each other).

Outputting demonstration content related to the demo devices 110 (e.g., presenting videos through a display of the smart demo apparatus 102). The demonstration content may include product detail information describing details of the demo devices 110 (e.g., pricing information, hardware/software components and so on), content illustrating capabilities of the electronic device, advertisement content related to the demo devices 110 (e.g., a television advertisement illustrating the capabilities of a device, an advertisement about a weekend sale of a device, etc.) and so on.

Any information that is generated and/or obtained from managing the demo devices 110 may be provided to the service provider 104 for processing. In some instances the smart demo apparatus 102 may store information about the demo devices 110 in a demo device information data store 232. This information may be provided to the service provider 104 upon request and/or periodically. This may allow the service provider 104 to operate based on current information about the demo devices 110.

The customer service module 226 may provide customer services to customers, merchants and others. Example customer services include:

Account management (e.g., creating an account, associating a device with an account, updating user information of an account and so on). In one example, a user may sign-up for a subscription-based service that provides access to content (e.g., a paid subscription to access a wide variety of eBook, music, videos and so on).

Diagnosing an error that has occurred on an electronic device (e.g., detecting device errors). In one example, the smart demo apparatus 102 may identify an electronic device that a user has brought in to a store (e.g., through a camera, reader or connection of the smart demo apparatus 102). To illustrate, the electronic device may be communicatively coupled to the smart demo apparatus 102 through a wireless connection and/or a wired connection (e.g., the one or more connectors 122). The electronic device may then be evaluated by sending information to the service provider 104.

Configuring an electronic device (e.g., updating an operating system, flashing a device and so on).

Returning or exchanging an electronic device (e.g., facilitating device returns and exchanges).

Connecting a user with a customer service representative. This may include facilitating a video conference between the customer service representative and the user through a display of the smart demo apparatus 102. For example, the display may present a video of the customer service representative and/or a video of the user. The customer service representative may discuss problems that the user is having with an electronic device, questions that the user has about an electronic device the user is looking at acquiring, questions that the user has about how a particular function works or any other information that is generally related to electronic devices.

The sales module 228 may provide sales services to a sales user (e.g., a representative of a merchant, a representative of a device supplier, a third party that assists in management of devices or any other user). These sales services may generally relate to the acquisition of electronic devices and may assist in selling and maintaining electronic devices. Example sales services include:

Providing sales content (e.g., presenting videos through a display of the smart demo apparatus 102, outputting audio presentations and so on). The sales content may include content for training sales representatives (e.g., key features of an electronic device or other product details), content for setting-up an electronic device (e.g., how to configure the device for demonstration, how to configure settings of the device for end-users and so on), content for maintenance of the electronic device (e.g., a maintenance schedule for updating the demo devices 110).

Collecting sales information. The sales information may generally relate to acquisitions of electronic devices. For example, the sales information may include information that describes how many electronic devices have been sold, how many electronic devices are in inventory, what sales techniques help sell electronic devices and so on.

Providing sales information to the service provider 104.

The content access module 230 may provide content to electronic devices (sometimes referred to as "device content"). This may include providing the content to a demo device or any other device that is within communication range of the smart demo apparatus 102. In some instances, content may be made available only while the users are connected to the smart demo apparatus 102. This may be referred to as "content staging." While in other instances, content may be provided for a more permanent storage on electronic devices (e.g., actual ownership of the content). The content may be streamed to an electronic device or may be stored on the smart demo apparatus 102 in a content data store 234 for later use/access by electronic devices. The content access module 230 may receive content from the service provider 104, such as an application, videos, music, images, eBooks and so on.

In some instances, the content access module 230 may provide access to content that may not otherwise be generally available. To illustrate, the content access module 230 may allow users to sample content that is available for acquisition (e.g., a portion of an eBook) or may allow users to view content that is available to members of a subscription-based service for accessing content. Here, the content may be made available only while the users are located within communication range of the smart demo apparatus 102. In another illustration, the content access module 230 may provide content that is only available to a device that is acquired through a merchant associated with the smart demo apparatus 102 (e.g., receive a free copy of the newest vampire book with the purchase of a tablet computer, receive the trilogy of a popular movie series for purchases over $200 and so on). In a yet further illustration, the content access module 230 may distribute any amount of content below a threshold (e.g., the first three hundred users to access the smart demo apparatus 102 receive a free copy of an eBook of their choosing). As such, the smart demo apparatus 102 may encourage users to interact with the smart demo apparatus 102 and/or visit a merchant where the smart demo apparatus 102 is located.

The memory 204 (as well as all other memory described herein) may include one or a combination of computer-readable media (e.g., storage media). Computer-readable media includes volatile and non-volatile, removable and non-removable media implemented in any method or technology for storage of information, such as computer readable instructions, data structures, program modules, or other data. Computer-readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. As such, computer-readable media comprises non-transitory computer-readable media.

While many operations are described herein as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

Example Service Provider

Figure 3:
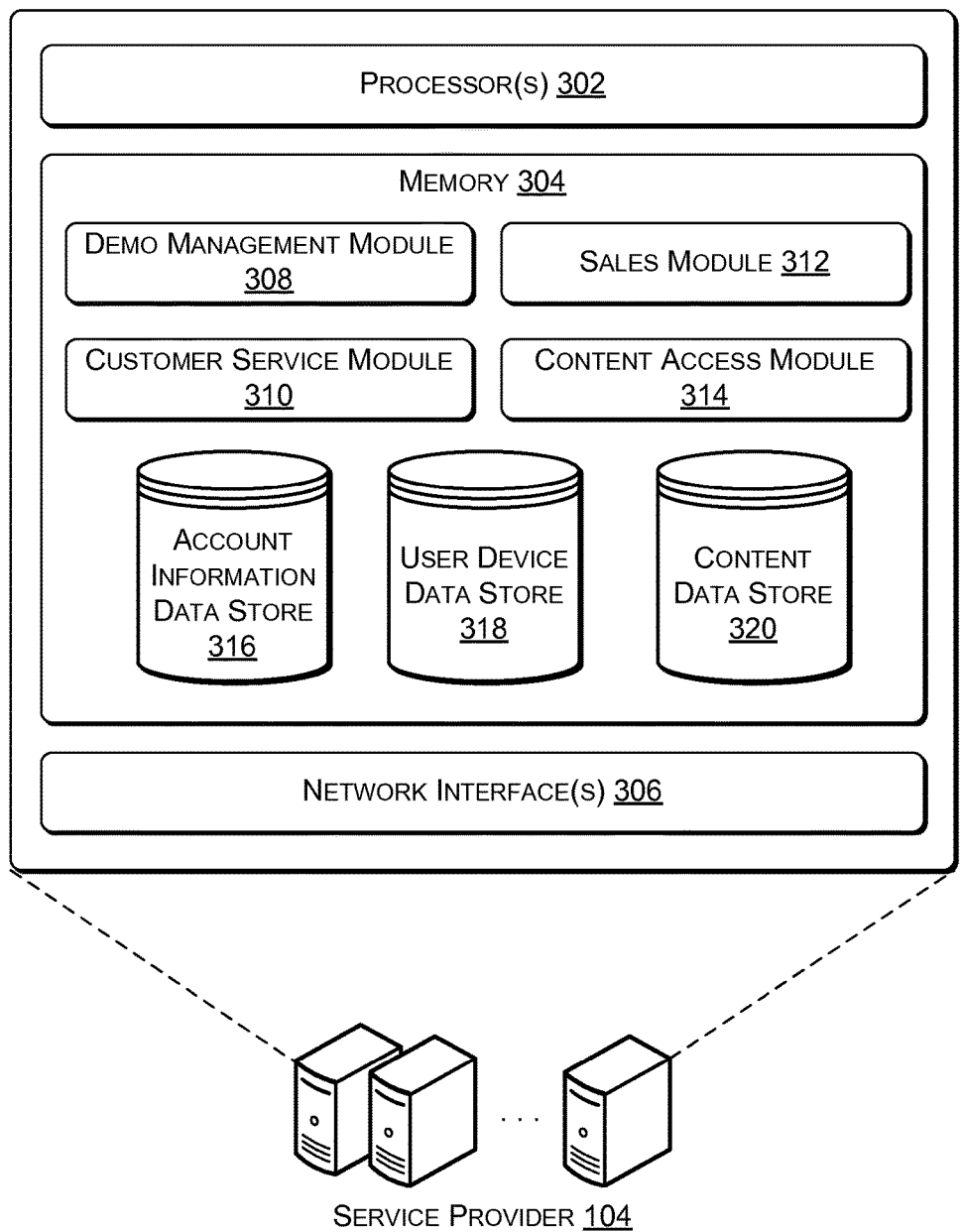
FIG. 3 illustrates details of an example service provider.

FIG. 3 illustrates example details of the service provider 104 of FIG. 1. As noted above, the service provider 104 may generally assist in managing the demonstration, acquisition and use of electronic devices. In some instances, the service provider 104 is involved in designing, manufacturing, marketing and/or distributing electronic devices that are demonstrated at the smart demo apparatus 102. Alternatively, or additionally, the service provider 104 may provide any number of services for using electronic devices, such as a content access service (e.g., subscription-based service to provide access to content), customer services (as described below) and so on.

As discussed above, the service provider 104 may be implemented as one or more computing devices. The one or more computing devices may be equipped with one or more processors 302, memory 304 communicatively coupled to the one or more processors 302 and one or more network interfaces 306. The one or more processors 302 may include a central processing unit (CPU), a graphics processing unit (GPU), a microprocessor, a digital signal processor, and so on. The memory 304 may include software and/or firmware functionality configured as one or more "modules." The term "module" is intended to represent example divisions of the software and/or firmware for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 3, the memory 304 may include a demo management module 308, a customer service module 310, a sales module 312 and a content access module 314. The modules 308-314 may be executable by the one or more processors 302 to perform various operations.

The demo management module 308 may assist in managing demo devices and/or smart demo apparatuses that hold the demo devices. Example operations that may be performed by the demo management module 308 include:

Receiving information from smart demo apparatuses about demo devices that the smart demo apparatuses are monitoring (e.g., performance information, user traffic information, power information and so on).

Diagnosing problems on demo devices.

Providing content to smart demo apparatuses to update content on demo devices (e.g., software updates, new applications to demonstrate and so on).

Providing demonstration content to smart demo apparatuses to display through the smart demo apparatuses.

Managing schedules for providing content and/or the types content that are provided to smart demo apparatuses (e.g., providing updates to all smart demo apparatuses at a particular merchant or across a particular geographical region). To illustrate, the demo management module 308 may provide a weekend advertisement (indicating that a particular electronic device is on-sale) to smart demo devices that are located within a particular geographical region and/or are located within stores of a particular merchant.

The customer service module 310 may provide customer services to customers, merchants and others through smart demo apparatuses. The customer service module 310 may generally provide the customer services through the smart demo apparatus 102. The customer services may include any of the customer services mentioned above, such as account management, error diagnostics and resolution for electronic devices, electronic device configuration, returns and exchanges and so on. In one example, the customer service module 310 manages account information stored in an account information data store 316. This account information may include information about an account of a user for electronic devices, such as login information, a password, credit card information, an address (e.g., mailing address), an email address, information identifying a device that is associated with the account and so on. A user may use an account to access content (e.g., make purchases, view content, etc.), sync content with a cloud service and perform a variety of other functions. The customer service module 310 may also manage user device information stored in a user device data store 318. The user device information may link a user to an electronic device, such as an electronic device that the user owns or has logged-on to. In some instances, the customer service module 310 may connect customers, merchants and others with customer service representatives (e.g., users), which may include video conferencing.

The sales module 312 may provide sales services to sales users and others through smart demo apparatuses. Examples sales services that may be performed by the sales module 312 include providing sales content to smart demo apparatuses to be presented to sales users (e.g., training videos), collecting sales information from smart demo apparatuses and so on.

The content access module 314 may provide content to smart demo apparatuses. This content may then be made available to electronic devices at the smart demo apparatuses. In some instances, the content access module 314 may provide access to particular types of content, such as samples of content that is offered for acquisition, content that is made available to members of a service, content that is made available upon acquisition of an electronic device or a particular amount of items purchased and so on. The content access module 314 may store content to be provided to smart demo apparatuses in a content data store 320.

Example Interfaces

Figure 4:
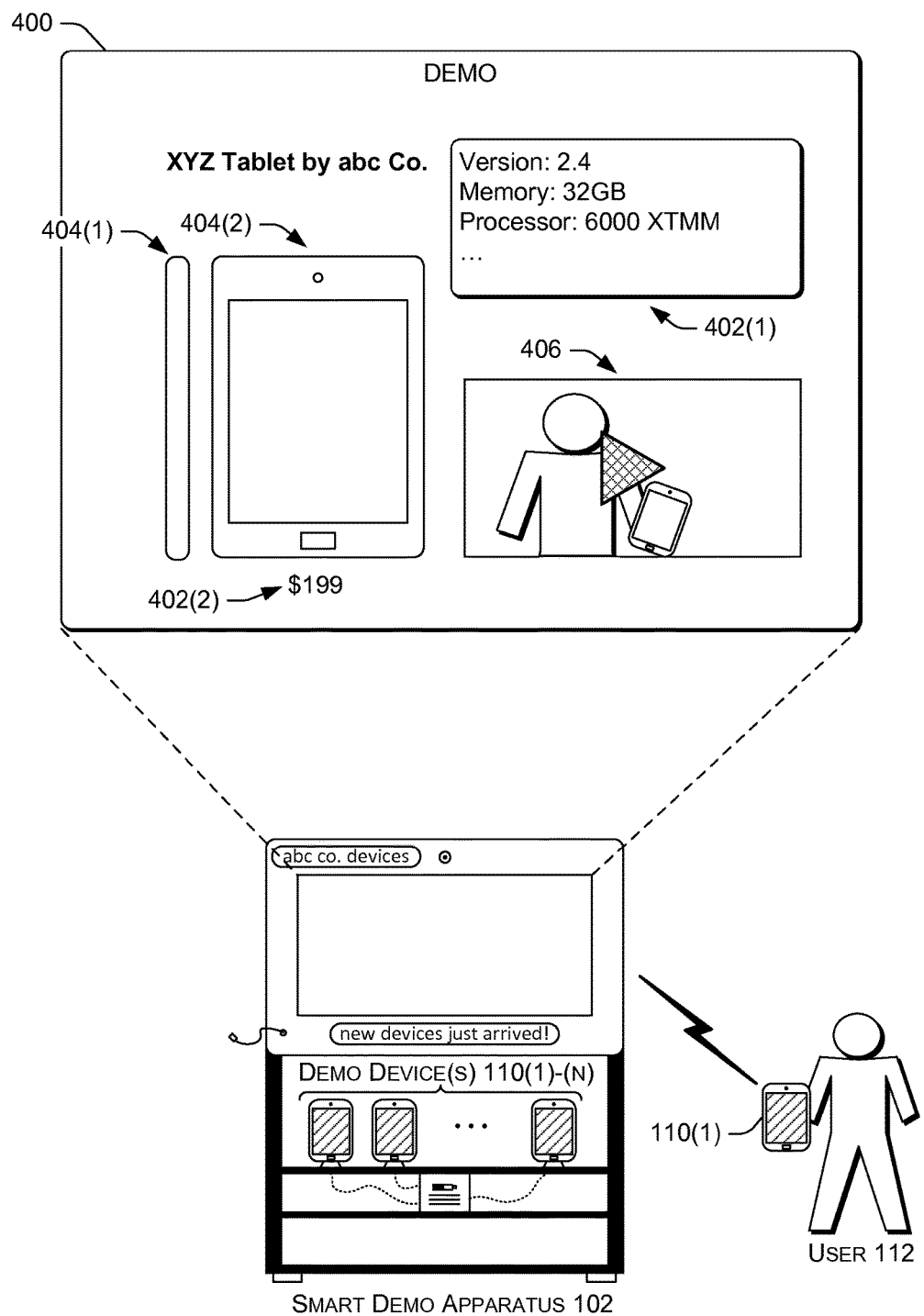
FIG. 4 illustrates an example demonstration interface that provides demonstration content regarding an electronic device that is being offered for acquisition.

FIG. 4 illustrates an example demonstration interface 400 that provides demonstration content regarding an electronic device that is being offered for acquisition. Here, the demonstration interface 400 is provided to a customer through the smart demo apparatus 102. In particular, the demonstration interface 400 is presented to the user 112 that is interacting with the demo device 110(1). In this example, the smart demo apparatus 102 may recognize that the user 112 is interacting with the demo device 110(1) based on the user 112 accessing content through the smart demo apparatus 102, such as online content that is provided through the smart demo apparatus 102. However, in other examples the smart demo apparatus 102 may recognize the use of the demo device 110(1) based on a signal from a sensor of a stand that indicates that the demo device 110(1) has been removed, a proximity sensor of the smart demo apparatus 102 detecting that the demo device 110(1) is within a predetermined distance to the smart demo apparatus 102, an image obtained by the smart demo apparatus 102 identifying the demo device 110(1), a reader device (e.g., the one or more readers 212) obtaining device identification information from the demo device 110(1) (e.g., the user 112 scanning the demo device 110(1) at the smart demo device 102) and so on.

In any event, the demonstration interface 400 may be provided to demonstrate the demo device 110(1). The demonstration interface 400 may include content that is specific to the demo device 110(1). That is, the content may indicate the exact capabilities and components of the demo device 110(1) or the corresponding electronic device that is being demonstrated. The demonstration interface 400 may present product details 402 of the demo device 110(1), which may include information 402(1) describing hardware/software components and pricing information 402(2). In this example, the pricing information 402(2) may present a current price of the demo device 110(1), or the corresponding electronic device, which may reflect current promotions or discounts for the demo device 110(1). The demonstration interface 400 may also include a profile image 404(1) and a front image 404(2) of the demo device 110(1). Further, the demonstration interface 400 may present an advertisement 406 related to the demo device 110(1). The user 112 may select the advertisement 406 to view a video illustrating the capabilities of the demo device 110(1).

Figure 5:
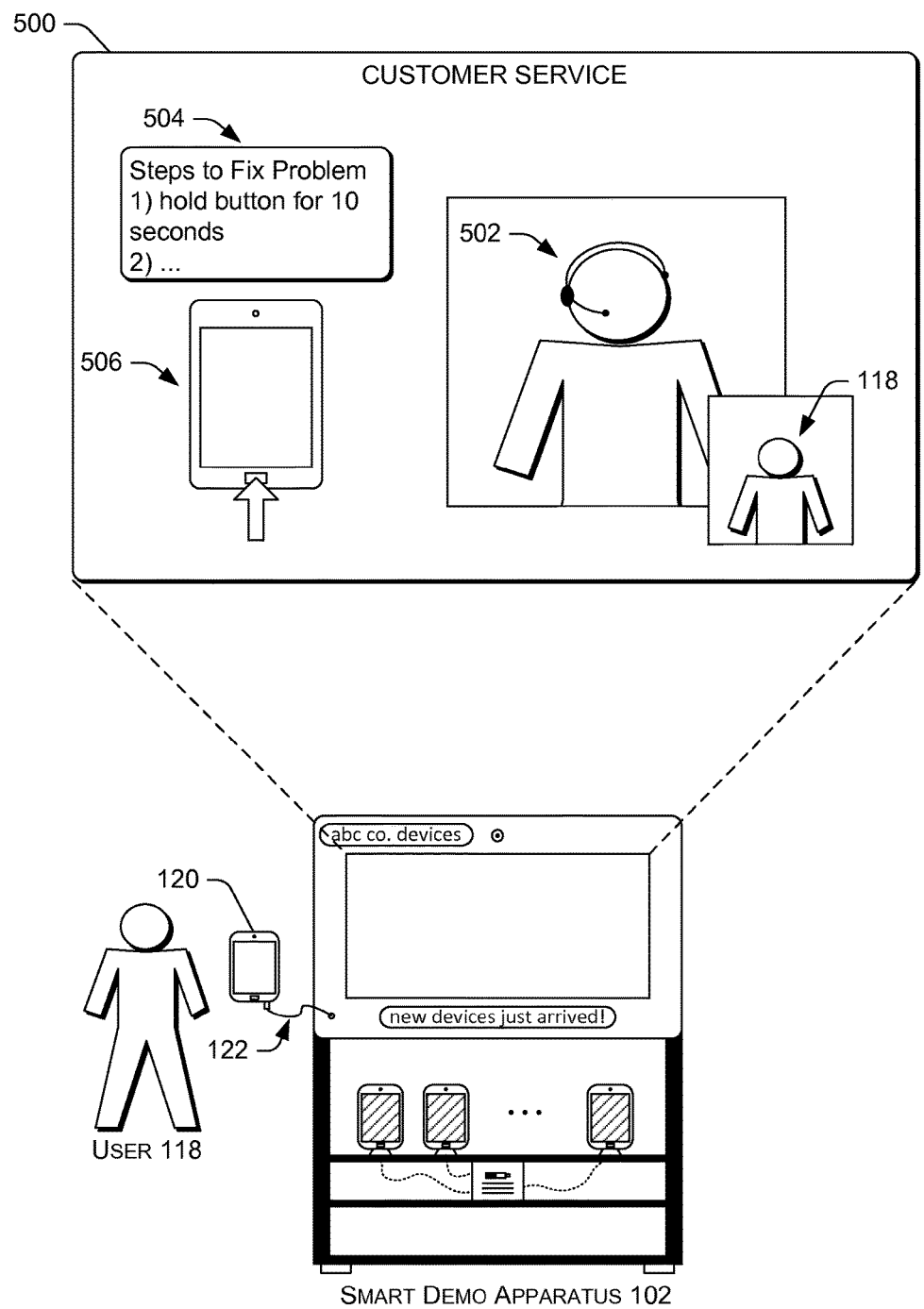
FIG. 5 illustrates an example customer service interface that provides customer services to a customer.

FIG. 5 illustrates an example customer service interface 500 that provides customer services to a customer. Here, the customer service interface 500 is provided to the user 118 that is experiencing issues with his electronic device 120 (e.g., a previously acquired device). The user 118 may connect the electronic device 120 to the smart demo apparatus 102 through the one or more connectors 122 to assist the user 118 is diagnosing and resolving an error. In this example, the user 118 is video chatting with a customer service representative 502 through the customer service interface 500, a camera of the smart demo apparatus 102 and a microphone of the smart demo apparatus 102. The service provider 104 has identified the error on the electronic device 120 and the customer service representative 502 is assisting the user 118 is fixing (e.g., resolving) the error. The customer service interface 500 provides step-by-step instructions 504 for fixing the error and presents an image 506 illustrating the steps that the user 118 should take.

Although in the example described above in reference to FIG. 5 the electronic device 120 is connected to the smart demo apparatus 102 through the one or more connectors 122, the electronic device 120 may alternatively, or additionally, be connected in other manners, such as through a wireless connection.

Figure 6:
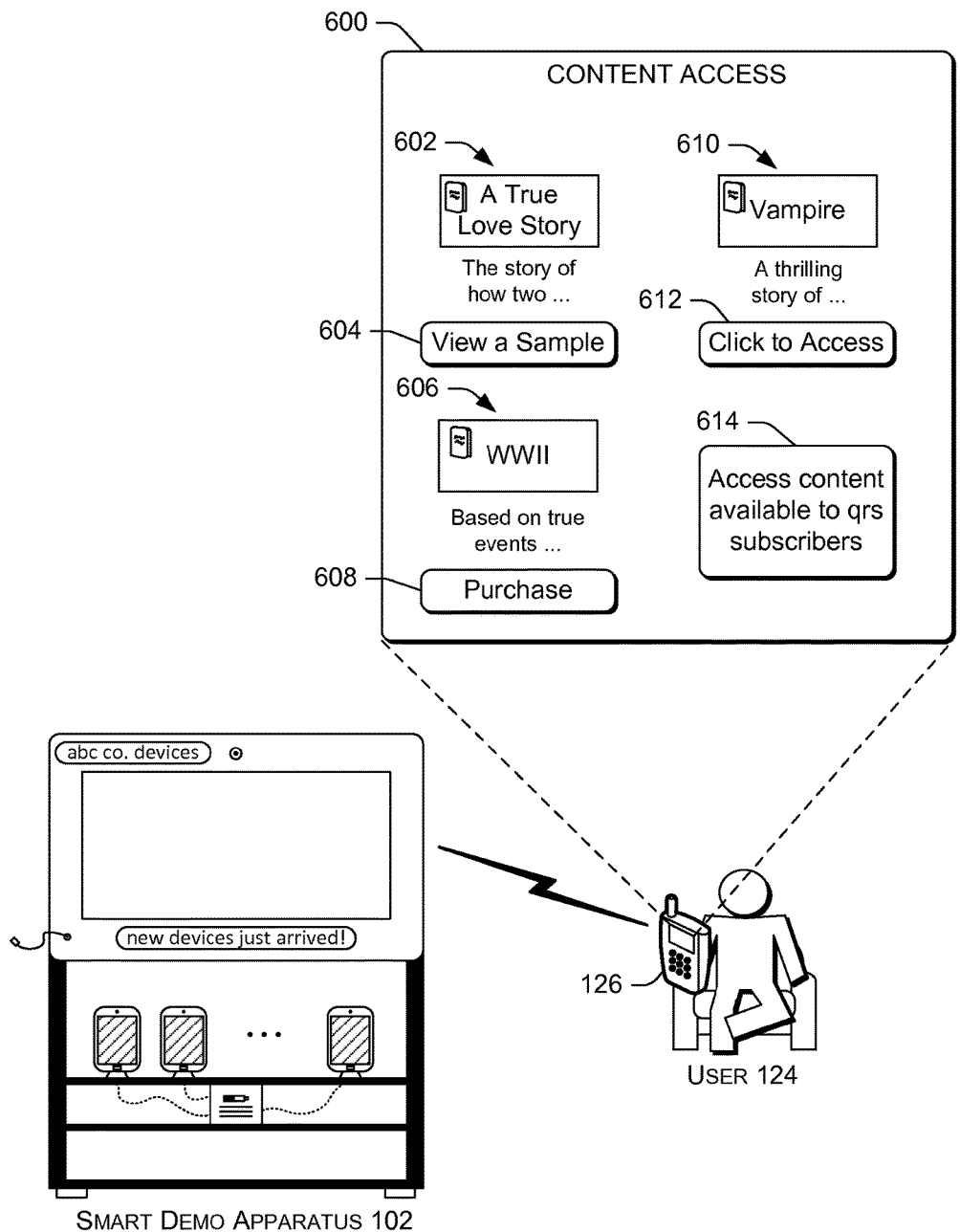
FIG. 6 illustrates an example content access interface that provides a user with access to content.

FIG. 6 illustrates an example content access interface 600 that provides a user with access to content. The smart demo apparatus 102 may act as a content access point in this example. The content access interface 600 may enable the user 124, who is employing the electronic device 126, to view a sample of an eBook 602 through selection of a button 604, to purchase an eBook 606 through selection of a button 608 and to access an entire eBook 610 through selection of a button 612. Here, the eBook 602 is being offered for acquisition to the general public, the eBook 606 is being offered exclusively for acquisition through smart demo apparatuses (e.g., the eBook 606 is not otherwise available to the general public) and the eBook 610 is being provided as part of a free access program (e.g., a read-for-free program where access to content is provided for a limited amount of time and/or while a device is located within a particular region or connected to a particular device). In some instances, if the eBook 606 is acquired through the smart demo apparatus 102, a merchant where the smart demo apparatus 102 is located may receive a portion of the revenue from the acquisition (e.g., revenue sharing).

In some instances, the eBooks 602, 606 and 610 may be stored locally on the smart demo apparatus 102, which may avoid having to access content over an unreliable and/or relatively low bandwidth connection. In other instances, the eBooks 602, 606 and 610 may be streamed, downloaded or otherwise accessed through the service provider 104. Further, in some instances the smart demo apparatus 102 may manage bandwidth allocation to electronic devices that connect to the smart demo apparatus 102.

The content access interface 600 may also include a button 614 to access content that is available to members of a subscription-based service (e.g., a paid content access service for streaming or otherwise gaining access to content). In this example, the user 124 may gain access to all content that is available to "qrs" subscribers (e.g., a fictitious subscription service). The access may be limited so that the content may only be accessed while the electronic device is connected to the smart demo apparatus 102.

Although not illustrate in FIG. 6, the smart demo apparatus 102 may provide other types of content to users. For example, the smart demo apparatus 102 may provide a coupon to an electronic device that connects to the smart demo apparatus 102, an advertisement of an item and so on. To illustrate, an advertisement for a device that is being offered for acquisition may be provided to a device when it is determined that the device is within proximity to the smart demo apparatus 102 (e.g., located in a store, held by a user who is browsing a nearby item for sale, connected to the smart demo apparatus 102, etc.). In other examples, the smart demo apparatus 102 may detect that a device is connected to the smart demo apparatus 102 or that the device is located within a predetermined proximity to the smart demo apparatus 102 (e.g., through reading an RFID chip in a device, through an NFC communication, etc.) and determine that the device is associated with a particular service (e.g., a user is a member of a paid content access service). Here, the smart demo apparatus 102 may automatically log the user in to the service, or prompt the user for login information, and provide access to content of that service. In some instances, content that may be accessed on the device 126 may be accessed through the smart demo apparatus 102 (e.g., through a display of the smart demo apparatus 102).

Figure 7:
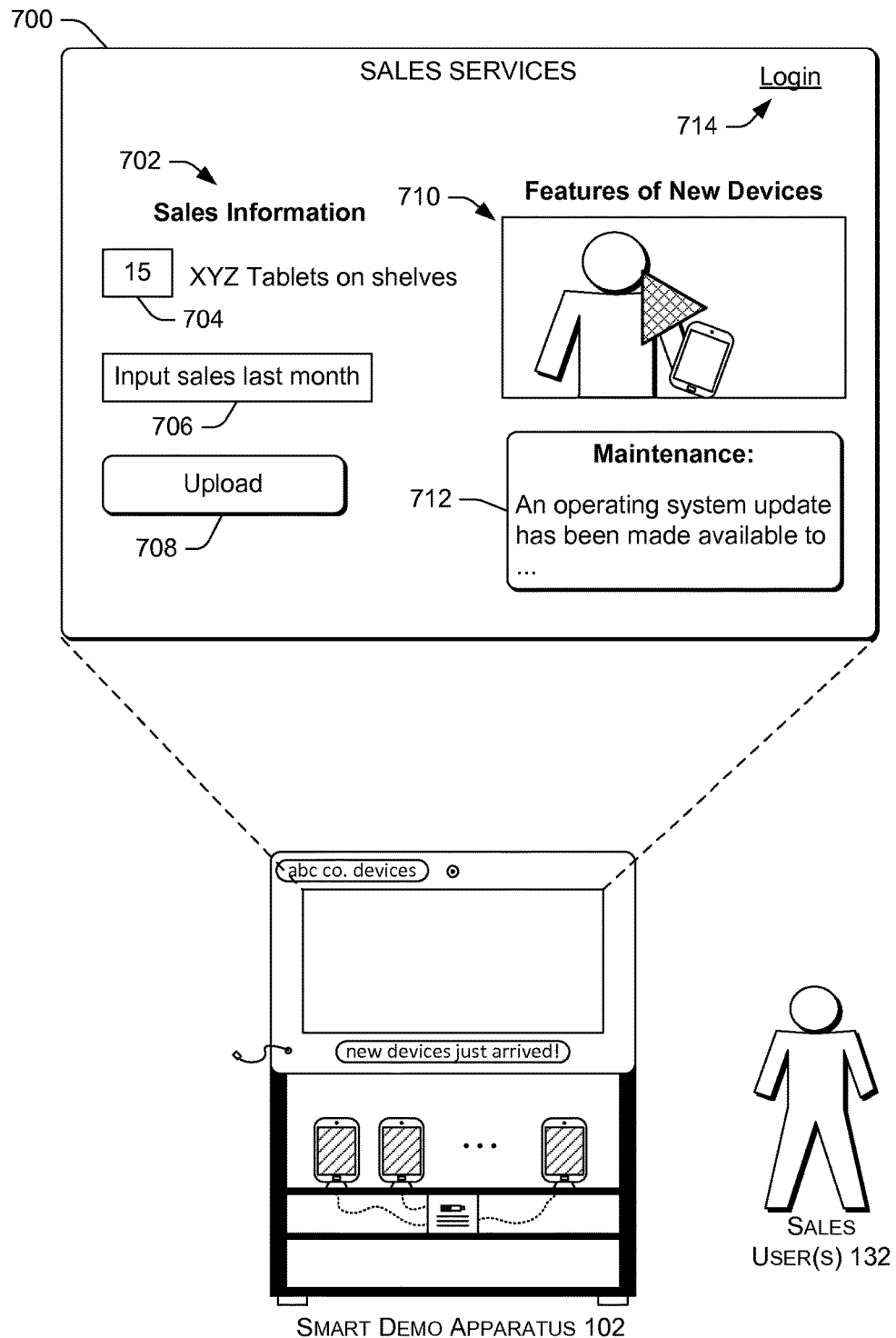
FIG. 7 illustrates an example sales interface that provides sales services.

FIG. 7 illustrates an example sales interface 700 that provides sales services. In this example, the sales interface 700 is provided through the smart demo apparatus 102 to the sales user 132 (e.g., a representative of a merchant, a representative of a supplier of the demo devices 110, a third party that assists in management of the demo devices 110 or another user). The sales interface 700 may include a section 702 for the sales user 132 to input sales information. For example, the sales user 132 may input a number of tablet computers that are on the shelves or other inventory-type information through an input field 704. Additionally, the sales user 132 may input, through an input field 706, an amount of tablet sales last month or a number of tablets that were sold last month. Upon selecting a button 708, the sales information may be uploaded to the service provider 104.

The sales interface 700 may also enable the sales user 132 to view a training video 710 about electronic devices that are demonstrated through the smart demo apparatus 102. This training video may illustrate key features of the electronic devices and/or illustrate how to set-up demonstration devices. The sales interface 700 further includes maintenance information 712 indicating that an operating system update has been made available for the demo devices 110. Upon receiving this information, the sales user 132 may select the information 712 to cause the update to be performed on the demo devices 110.

In some instances, the sales user 132 may login through a link 714 to a service provided by a service provider (e.g., the service provider 104) to access particular types of content. For example, if a representative of a supplier of the demo devices 110 is in a store where the smart demo apparatus 102 is located, the representative may login to access information of a service provider that is generally not available to representatives of a merchant, such as information indicating a number of devices that have been sold across all types of merchants, pricing details of parts of the demo devices 110 or any other information that may be restricted.

Figure 8:
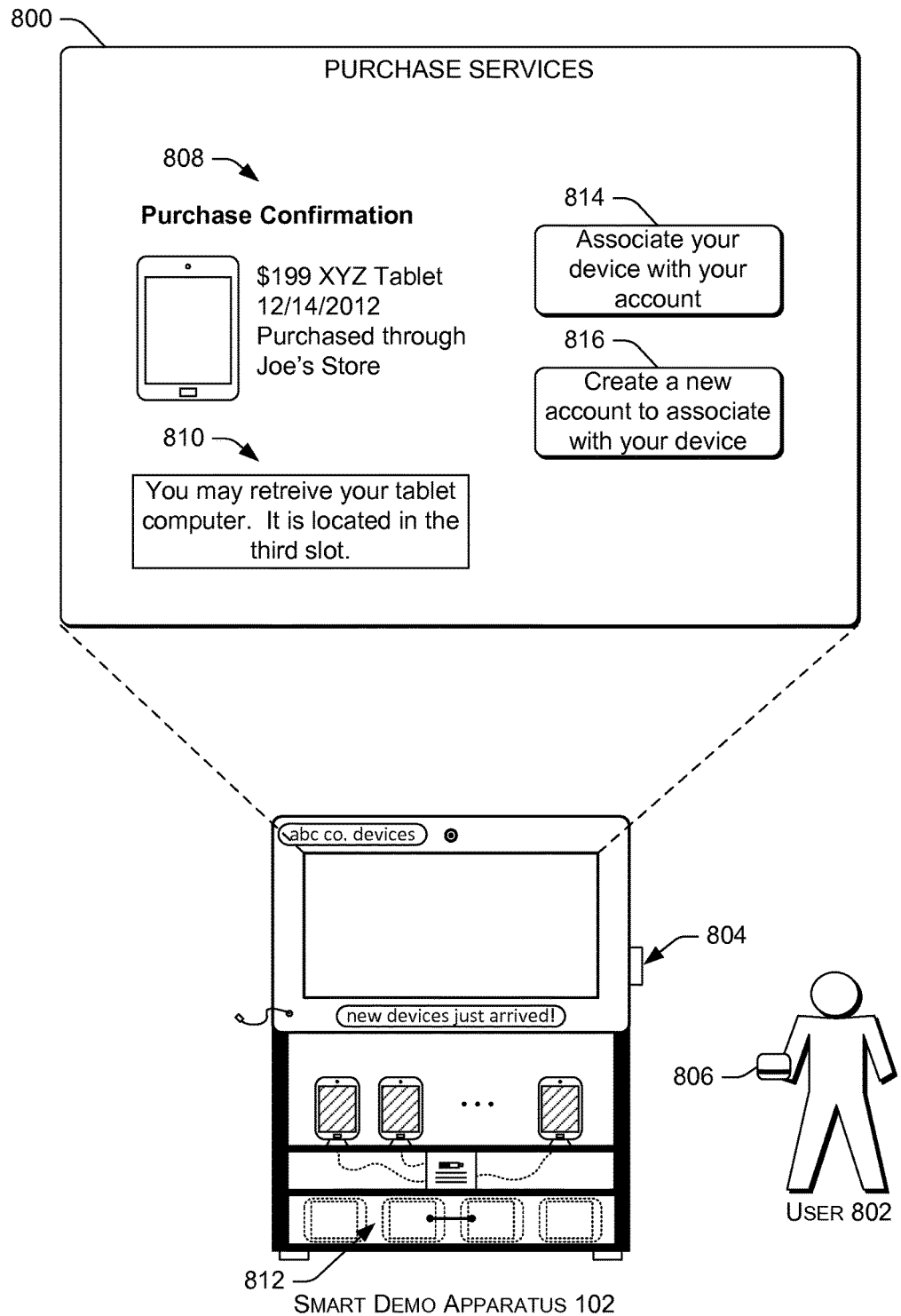
FIG. 8 illustrates an example purchase interface that is presented upon acquiring an electronic device through a smart demo apparatus.

FIG. 8 illustrates an example purchase interface 800 that may be presented upon acquiring an electronic device through the smart demo apparatus 102. In this example, a user 802 may interact with the smart demo apparatus 102 to acquire an electronic device directly through the smart demo apparatus 102. Here, the smart demo apparatus 102 includes a card reader 804 to read information of a financial instrument, namely a credit card 806 of the user 802. In other examples, the smart demo apparatus 102 may receive cash, coin or any other form of payment.

As illustrated in FIG. 8, the user 802 has acquired an electronic device and the purchase interface 800 provides confirmation information 808 regarding the purchase and information 810 indicating how the electronic device can be retrieved. Here, the smart demo apparatus 102 includes a drawer 812 that houses electronic devices being offered for acquisition. Although other enclosures may be used to house the electronic devices, such as lockers and so on. The smart demo apparatus 102 may unlock the drawer 812 upon completion of the acquisition (e.g., authorization of the credit card 806). In some instances, electronic devices may be individually secured and an electronic device that is to be retrieved may be released upon acquisition of the electronic device and/or opening of the drawer 812. The user 802 may then retrieve his new electronic device from the drawer 812.

The purchase interface 800 may also enable the user 802 to associate an account with his newly acquired electronic device. If, for example, the user 802 has already created an account, then the user 802 may select a button 814 to associate his electronic device with the existing account. Here, the user 802 may be prompted to login to his account and the smart demo apparatus 102 may associate (e.g., register) his electronic device with the account. Alternatively, if the user 802 has not yet created an account, the user 802 may select a button 816 to create an account and thereafter associate the account with the electronic device.

Although in the example of FIG. 8 the smart demo apparatus 102 is used to acquire an electronic device, in other examples content or other types of items may be acquired through the smart demo apparatus 102. To illustrate, the user 802 may insert cash or coin to the smart demo apparatus 102 to acquire content (e.g., music, videos, an app, etc.) and then download the content to an electronic device in a wireless manner or by connecting the electronic device to the smart demo apparatus 102 (e.g., through the one or more connectors 122). In another illustration, the user 802 may purchase an item or service through the smart demo apparatus 102 (e.g., an accessory for a device, a warranty for device, a compact disc or any other item or service). An item may be housed in the smart demo apparatus 102 in a similar fashion as the devices are housed in the drawer 812 or may be located at another location (e.g., in the storage area of a store, in a neighboring enclosure, etc.).

Example Processes

Figure 9:
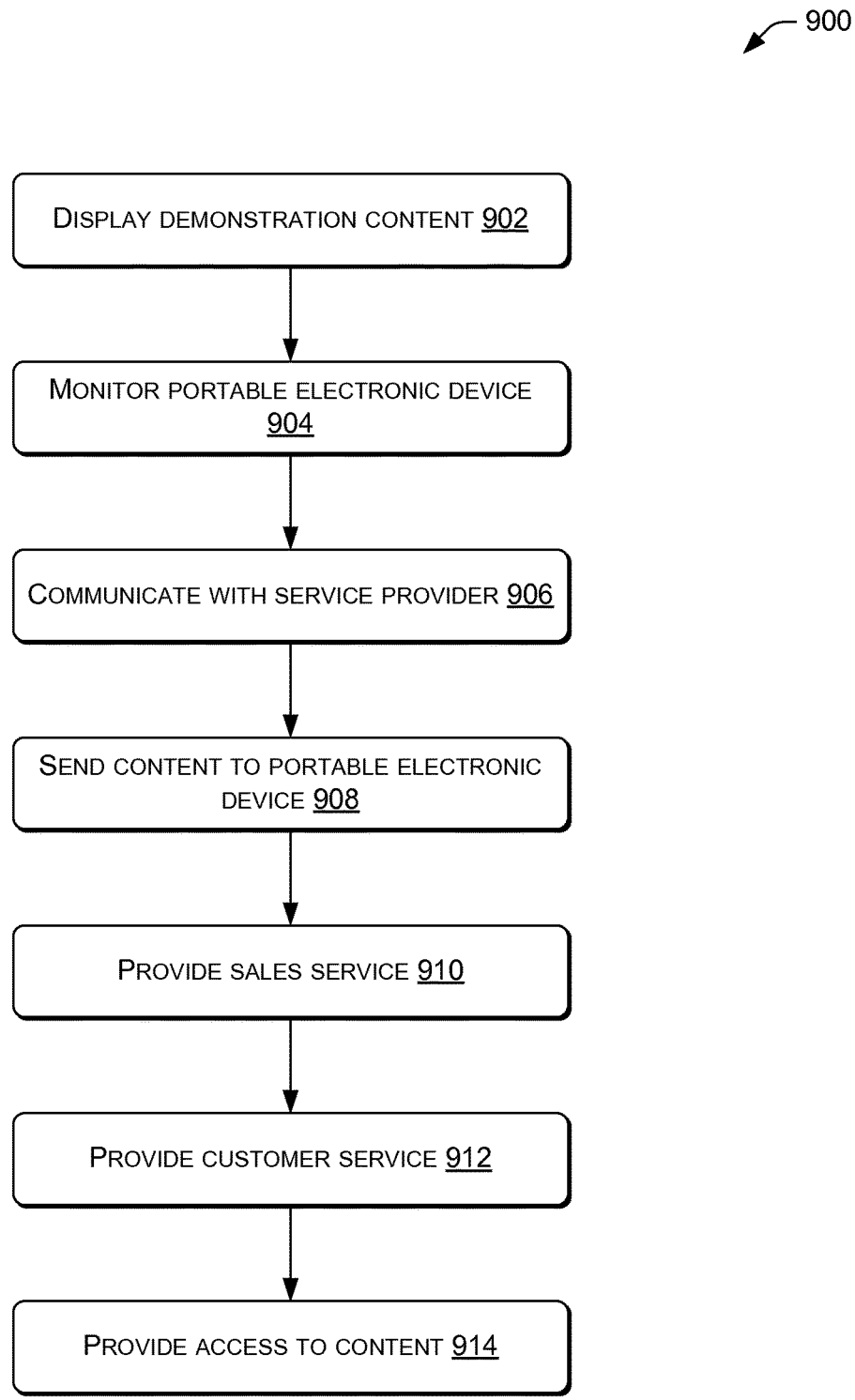
FIG. 9 illustrates an example process to control a portable electronic device being demonstrated.
Figure 10:
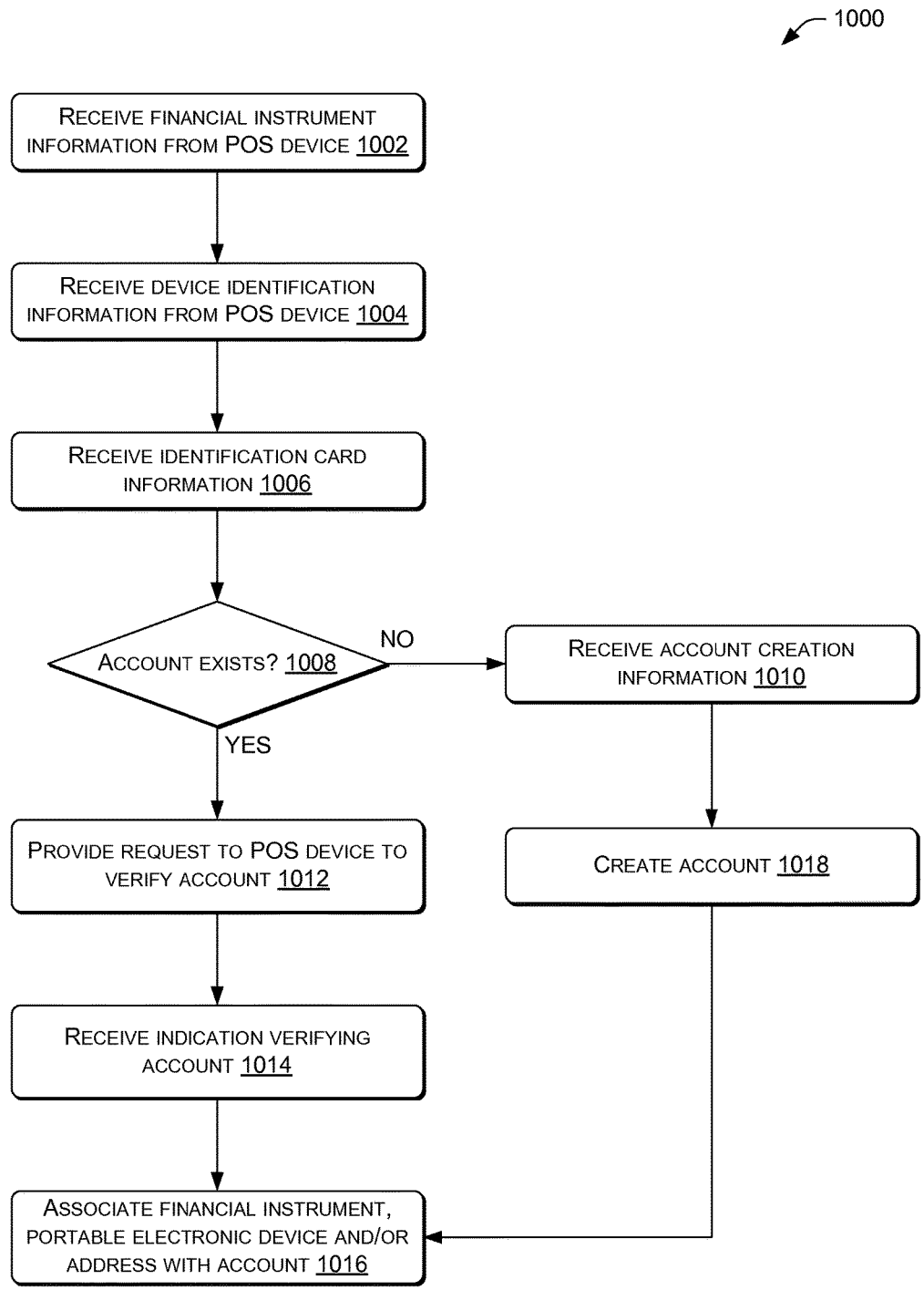
FIG. 10 illustrates an example process to associate information with a user account when an electronic device is acquired.
Figure 11:
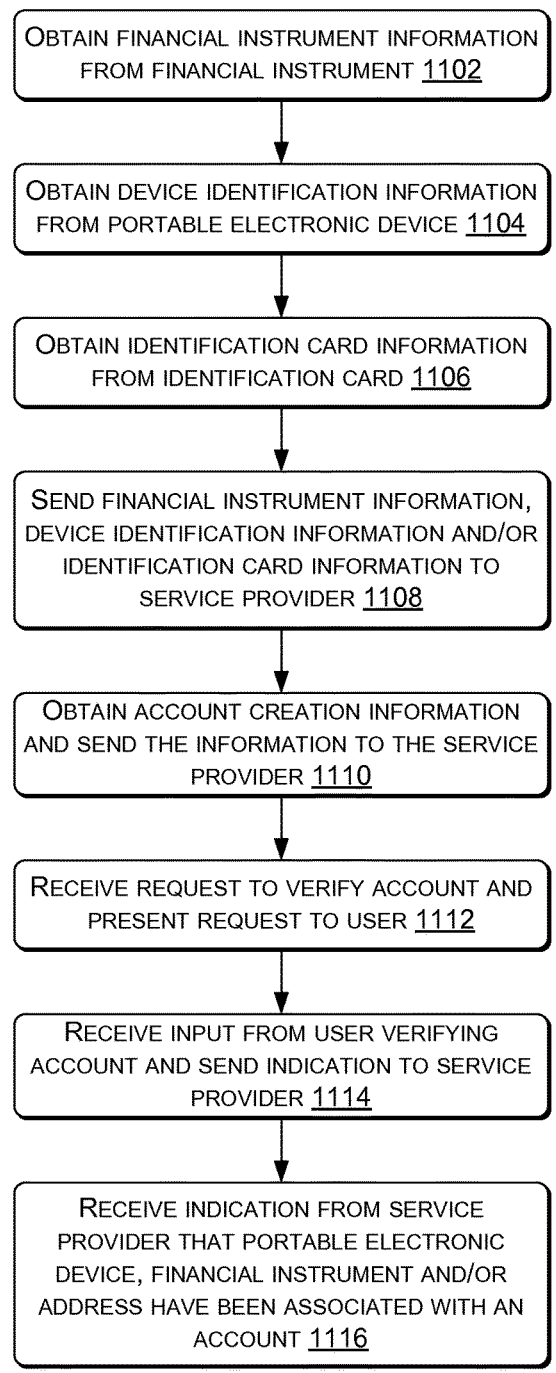
FIG. 11 illustrates an example process to provide information to a service provider to be associated with an account of a user.

FIGS. 9-11 illustrate example processes 900, 1000 and 1100 for implementing techniques described herein. For ease of illustration the processes 900, 1000 and 1100 are described as being performed in the architecture 100 of FIG. 1. For example, one or more of the individual operations of the process 900 may be performed by the smart demo apparatus 102, one or more of the individual operations of the process 1000 may be performed by the service provider 104 and one or more of the individual operations of the process 1000 may be performed by the POS device 106 and/or the smart demo apparatus 102. However, the processes 900, 1000 and 1100 may be performed in other architectures. Moreover, the architecture 100 may be used to perform other processes.

The processes 900, 1000 and 1100 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the operations may be omitted.

FIG. 9 illustrates the example process 900 to control a portable electronic device being demonstrated.

At 902, the smart demo apparatus 102 may display demonstration content through a display of the smart demo apparatus 102. The demonstration content may relate to a portable electronic device that is being demonstrated to customers at a merchant. For example, the demonstration content include product detail information describing details of the portable electronic device, content illustrating capabilities of the portable electronic device, advertisement content related to the portable electronic device and so on.

At 904, the smart demo apparatus 102 may monitor the portable electronic device that is being demonstrated. The monitoring may include monitoring use of the portable electronic device by the customers, performance of the portable electronic device, power provided to the portable electronic device and/or a current amount of power of the portable electronic device. To illustrate, the monitoring may include monitoring use of the portable electronic device by detecting interaction events that have occurred. An interaction event may comprise removing the portable electronic device from the smart demonstration device 102, accessing an application on the portable electronic device and/or contacting the display or a button on the portable electronic device.

At 906, the smart demo apparatus 102 may communicate with the service provider 104. The communicating may include receiving content (e.g., device content) for the portable electronic device from the service provider 104, receiving an instruction to check the performance or functionality of the portable electronic device, sending information to the service provider 104 about the portable electronic device (e.g., performance information, power information, diagnostics information, etc.) and so on. In one example, the smart demo apparatus 102 may send information to the service provider 104 that describes interaction events that have occurred.

At 908, the smart demo apparatus 102 may send content to the portable electronic device to update content of the portable electronic device. For example, the smart demo apparatus 102 may send device content to the portable electronic device that has been received from the service provider 104. The device content may include an application, operating system, videos, audio, images, eBooks, etc.

At 910, the smart demo apparatus 102 may provide a sales service. This may include receiving sales content from the service provider 104 and providing (e.g., displaying or otherwise outputting) the sales content to a sales user (e.g., a representative of the merchant, a representative of a supplier, a third party, etc.). The sales content may comprise content for training a sales user, content for setting-up the portable electronic device, content for maintenance of the portable electronic device and so on.

At 912, the smart demo apparatus 102 may provide a customer service to a customer, a merchant and/or others. In some instances, the customer service may be provided through a display of the smart demo apparatus 102. The customer service may include, for example, account management, error diagnostics and resolution for electronic devices, electronic device configuration, returns and exchanges and so on.

At 914, the smart demo apparatus 102 may provide access to content. This may include receiving content from the service provider 104 and providing the content to a portable electronic device that is located at the merchant. In some instances, the content may be stored at the smart demo apparatus 102 for later access. Further, in some instances the content may be provided by wirelessly streaming the content to a portable electronic device that is located within communication range of the smart demo apparatus 102.

FIG. 10 illustrates the example process 1000 to associate information with a user account when an electronic device is acquired.

At 1002, the service provider 104 may receive financial instrument information from the POS device 106. The financial instrument information may identify a financial instrument (e.g., may comprise a credit card number) and a user that is acquiring a portable electronic device via the POS device 106. The financial instrument information may have been obtained at the POS device 106 through a card reader.

At 1004, the service provider 104 may receive device identification information from the POS device 106. The device identification information may identify the portable electronic device that is being acquired via the POS device 106. The device identification information may have been obtained at the POS device 106 through a barcode reader or other type of reader device.

At 1006, the service provider 104 may receive identification card information from the POS device 106. The identification card information may identify an address associated with the user (e.g., a billing address, residence address, etc.). The identification card information may have been obtained at the POS device 106 from an identification card, such as a driver's license, an identification (ID) card and so on.

At 1008, the service provider 104 may utilize the financial instrument information and/or identification card information to determine whether or not an account exists for the user (e.g., identify an account). An account may generally enable a user to access content, sync content of a device with a cloud service, acquire content and so on. If an account does not exist, the process 1000 may proceed to 1010 (e.g., the "NO" path). Alternatively, if an account does not exist the process may proceed to 1012 (e.g., the "YES" path).

At 1012, the service provider 104 may provide a request to the POS device 106 to verify that an identified account is associated with the user. The POS device 106 may prompt the user to verify the account. When the account is verified, at 1014 the service provider 104 may receive an indication from the POS device 106 verifying that the identified account is associated with the user.

At 1016, the service provider 104 may associate the financial instrument, the portable electronic device and/or the address of the user with the account. This may occur at substantially a same time as when the portable electronic device is acquired. For example, the association may occur within a predetermined time period after a payment transaction for the portable electronic device has been authorized (e.g., with a few seconds). In another example, the association may occur before the user leaves a merchant's store or walks away from the POS device 106.

In returning to instances where an account does not exist, at 1010 the service provider 104 may receive account creation information from the POS device 106. The account creation information may include a login and/or a password. The account creation information may have been obtained at the POS device 106 from the user, such as a through an input device of the POS device 106 (e.g., keyboard, keypad, touch screen, etc.).

At 1018, the service provider 104 may create an account for the user based on the login and/or password. This may include registering the user with the service provider 104 so that the user may use an electronic device, access content, sync content and so on. The process 1000 may then proceed to operation 1016.

FIG. 11 illustrates the example process 1100 to provide information to a service provider to be associated with an account of a user. As noted above, the process 1000 may be performed by the POS device 106 and/or the smart demo apparatus 102. For ease of illustration, the process 1100 is described as being performed by the POS device 106.

At 1102, the POS device 106 may obtain financial instrument information from a financial instrument. The financial instrument information may identify the financial instrument and a user that is acquiring a portable electronic device via the POS device 106.

At 1104, the POS device 106 may obtain device identification information from the portable electronic device. This may include reading a barcode or other marker on the portable electronic device.

At 1106, the POS device 106 may obtain identification card information from an identification card associated with the user, such as a driver's license, ID card and so on. The identification card information may identify an address associated with the user.

At 1108, the POS device 106 may send the financial instrument information, the device identification information and/or the identification card information to the service provider 104 for processing. The service provider 104 may seek to associate the information with an account of the user.

If an account does not exist, at 110 the POS device 106 may obtain account creation information from the user. The account creation information may include a login and/or password. The account creation information may be sent to the service provider 104 at 110.

In some instances, such as when an account already exists, at 1112 the POS device 106 may receive a request from the service provider 104 to verify that an identified account is associated with the user. The request may be presented to the user. If the user indicates that the account is associated with the user, then at 1114 the POS device 106 may receive input from the user verifying the account and may send an indication to the service provider 104 to indicate such verification.

At 1116, the POS device 106 may receive an indication from the service provider 104 indicating that the portable electronic device, financial instrument and/or address have been associated with the account (e.g., an existing account or a newly created account).

Although many of the operations of the processes 1000 and 1100 describe providing information between the service provider 104 and the POS device 106, it should be appreciated that this may include providing the information directly from one entity to another or providing the information from one entity to another through an intermediary entity (e.g., a credit card exchange).

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
a stand to removably receive a first device;
a power supply unit to provide power to the first device;
one or more processors;
a reader configured to determine device identification information for the first device;
a network component communicatively coupled to receive, via a cellular connection, digital content from a service provider; and
memory storing instructions that, when executed by the one or more processors, cause the one or more processors to:
based at least in part on the device identification information, determine demonstration content for the first device, the demonstration content comprising at least one of product detail information describing details of the first device or content illustrating capabilities of the first device; and
provide the digital content to the first device; and
cause display of the demonstration content.

2. The system of claim 1, wherein the instructions further cause the one or more processors to detect that an amount of power that is supplied to the first device is below a threshold; and wherein the power supply unit is configured to provide power to the first device in response to a determination that the amount of power that is supplied to the first device is below the threshold.

3. The system of claim 1, wherein the reader comprises at least one of a barcode reader, a Quick Response (QR) code reader or a Radio-Frequency Identification (RFID) reader.

4. The system of claim 1, wherein the instructions further cause the one or more processors to:
monitor an amount of use of the first device by customers; and
create log information describing interaction events that have occurred, each of the interaction events comprising at least one of removing the first device from the stand, accessing an application on the first device or contacting the display or a button on the first device; and wherein the network component is further configured to send the log information to the service provider.

5. The system of claim 1, further comprising:
a camera and a microphone that are configured to enable a customer to communicate with a customer service representative to perform a customer service, the customer service comprising at least one of managing a user account associated with the customer, detecting an error on an electronic device associated with the customer, configuring the electronic device that is associated with the customer or facilitating a return or exchange of the electronic device that is associated with the customer.

6. The system of claim 1, further comprising:
an enclosure to house an electronic device that is being offered for acquisition via the system, the enclosure being configured to release the electronic device upon an acquisition of the electronic device via the system.

7. The system of claim 6, wherein the instructions further cause the one or more processors to, based at least in part on acquisition of the electronic device via the system, cause display of at least one of:
a purchase confirmation of the electronic device;
information indicating how to retrieve the electronic device from the enclosure;
an interface for associating an account with the electronic device; or an interface for creating an account to associate with the electronic device.

8. The system of claim 1, wherein the digital content comprises at least one of a video, audio, an electronic book (eBook), an image or an application.

9. The system of claim 1, wherein the instructions further cause the one or more processors to provide the digital content to another electronic device upon acquisition of the digital content through the system.

10. The system of claim 1, wherein the instructions further cause the one or more processors to provide another electronic device with access to the digital content while the other electronic device is connected to the system, the digital content comprising content that is made available to members of a subscription-based service for accessing the content.

11. The system of claim 1, wherein the instructions further cause the one or more processors to detect an error that has occurred on the first device;
and wherein the network component is further configured to send information regarding the error to the service provider via the cellular connection and configured to receive information regarding resolution of the error from the service provider via the cellular connection.

12. The system of claim 1, wherein:
the network component is configured to receive sales content from the service provider, the sales content comprising at least one of content for training a sales user, content for setting-up the first device or content for maintenance of the first device; and
the display is configured to display the sales content.

13. The system of claim 1, wherein the instructions further cause the one or more processors to:
receive additional digital content from the service provider, the additional digital content comprising at least one of a sample of content that is available for acquisition or content that is available to members of a subscription-based service for accessing the content;
store the additional digital content for later access; and
provide the additional digital content to a portable electronic device when the portable electronic device is located within communication range of the system.

14. The system of claim 1, wherein the instructions further cause the one or more processors to:
diagnose an error that has occurred on a portable electronic device that is communicatively coupled to the system through at least one of a wireless connection or a wired connection; and
cause a video of a customer service representative to be presented via the display to assist in resolving the error.

15. The system of claim 1, wherein the instructions further cause the one or more processors to detect that a current amount of power of the first device is below a threshold;
and wherein the power supply unit is configured to provide power to the first device in response to a determination that the current amount of power of the first device is below a threshold.

16. A system comprising:
a stand to removably receive a first device;
a power supply to provide power to the first device;
one or more processors;
a network component communicatively coupled to receive digital content from a service provider; and
memory storing instructions that, when executed by the one or more processors, cause the one or more processors to:
provide the digital content to the first device to update the first device, and
detect an error that has occurred on the first device, the error indicating a problem with functionality of a component of the first device;
wherein the network component is further configured to send information regarding the error to the service provider.

17. The system of claim 16, wherein the instructions further configure the one or more processors to:
detect that a portable electronic device is connected to the system; and
based at least in part on a determination that the portable electronic device is connected to the system, provide the portable electronic device with access to additional content that is made available to members of a subscription-based service.

18. The system of claim 16, wherein:
the network component is further configured to receive information regarding resolution of the error from the service provider; and
the instructions further cause the one or more processors to take an action to resolve the error based at least in part on the information regarding resolution of the error.

19. A system comprising:
one or more processors;
a display configured to display demonstration content regarding a first device, the demonstration content comprising at least one of product detail information describing details of the first device or content illustrating capabilities of the first device;
a power supply unit to provide power to the first device;
a network component communicatively coupled to receive digital content from a service provider;
memory communicatively storing instructions that, when executed by the one or more processors, cause the one or more processors to perform operations comprising:
detecting that a portable electronic device is connected to the system;
based at least in part on detecting that the portable electronic device is connected to the system, providing the portable electronic device with access to additional content that is made available to members of a subscription-based service; and
sending the digital content to the first device.

* * * * *